US011838697B2

(12) United States Patent
Zhong et al.

(10) Patent No.: US 11,838,697 B2
(45) Date of Patent: Dec. 5, 2023

(54) ULTRA-SHORT-THROW PICTURE AND SCREEN ALIGNMENT METHOD AND APPARATUS, AND STORAGE MEDIUM

(71) Applicant: CHENGDU XGIMI TECHNOLOGY CO., LTD., Sichuan (CN)

(72) Inventors: Bo Zhong, Sichuan (CN); Shi Xiao, Sichuan (CN); Xin Wang, Sichuan (CN); Lizao Zhang, Sichuan (CN)

(73) Assignee: CHENGDU XGIMI TECHNOLOGY CO., LTD., Sichuan (CN)

( * ) Notice: Subject to any disclaimer, the term of this patent is extended or adjusted under 35 U.S.C. 154(b) by 37 days.

(21) Appl. No.: 17/599,560

(22) PCT Filed: Mar. 13, 2020

(86) PCT No.: PCT/CN2020/079143
§ 371 (c)(1),
(2) Date: Sep. 29, 2021

(87) PCT Pub. No.: WO2021/093232
PCT Pub. Date: May 20, 2021

(65) Prior Publication Data
US 2022/0321850 A1    Oct. 6, 2022

(30) Foreign Application Priority Data
Nov. 11, 2019    (CN) .......................... 201911094746.2

(51) Int. Cl.
*H04N 9/31* (2006.01)
*G06T 7/194* (2017.01)
*G06T 7/70* (2017.01)

(52) U.S. Cl.
CPC .......... *H04N 9/3185* (2013.01); *G06T 7/194* (2017.01); *G06T 7/70* (2017.01); *H04N 9/317* (2013.01)

(58) Field of Classification Search
None
See application file for complete search history.

(56) References Cited

U.S. PATENT DOCUMENTS

| | | | |
|---|---|---|---|
| 10,831,286 B1* | 11/2020 | Pepose | G06F 3/011 |
| 2006/0018168 A1 | 1/2006 | Kim | |
| 2006/0181686 A1* | 8/2006 | Matsuda | H04N 9/3194 353/69 |
| 2008/0129894 A1 | 6/2008 | Kang et al. | |

(Continued)

FOREIGN PATENT DOCUMENTS

| | | |
|---|---|---|
| CN | 107547880 A | 1/2018 |
| CN | 107547881 A | 1/2018 |

(Continued)

*Primary Examiner* — Stefan Gadomski
(74) *Attorney, Agent, or Firm* — Yu Gang (57) ABSTRACT

This application provides an ultra-short-throw picture and screen alignment method which includes the steps: acquiring an image by a wide-angle camera and performing positioning according to the image to obtain a projection position when a current projection picture of an ultra-short-throw projector covers a screen; adjusting a size and a position of the current projection picture according to a position of the screen and the projection position, so that the position of the adjusted projection picture is overlapped with a target position.

19 Claims, 4 Drawing Sheets

(56) References Cited

U.S. PATENT DOCUMENTS

2016/0088276 A1    3/2016  Lin et al.
2016/0188121 A1*   6/2016  Lyubarsky ............ G06F 3/0425
                                                345/175
2018/0113567 A1*   4/2018  Chen .................... H04N 9/3179

FOREIGN PATENT DOCUMENTS

| CN | 108063928 A | 5/2018 |
| CN | 109040728 A | 12/2018 |
| CN | 109104596 A | 12/2018 |
| CN | 110636274 A | 12/2019 |
| JP | 2004312690 A | 11/2004 |
| JP | 2005124133 A | 5/2005 |
| JP | 2012220709 A | 11/2012 |
| JP | 2014085413 A | 5/2014 |

\* cited by examiner

Fig. 4 acquire an image of the screen by the wide-angle camera and position the screen by means of an image processing technology according to the image of the screen when the picture of the ultra-short-throw projector covers the screen, the image processing technology is an image segmentation method When a current projection picture of the ultra-short-throw projector covers a screen, an image is acquired by a wide-angle camera, and positioning is performed according to the image to obtain the projection position According to a position of the screen and the projection position, a size and a position of the current projection picture are adjusted, so that the position of the adjusted projection picture is overlapped with a target position

Fig. 5 when an all-black video is projected, use the wide-angle camera to acquire an all-black image comprising the all-black video, and take the all-black image as a background image when an all-white video is projected, use the wide-angle camera to acquire an all-white image comprising the all-white video, and take the all-white image as a foreground image differentiate the background image and the foreground image to obtain the projection position

ULTRA-SHORT-THROW PICTURE AND SCREEN ALIGNMENT METHOD AND APPARATUS, AND STORAGE MEDIUM

TECHNICAL FIELD

This application relates to the technical field of projection of ultra-short-throw projectors, in particular to, an ultra-short-throw picture and screen alignment method, an ultra-short-throw picture and screen alignment apparatus, an ultra-short-throw projector, and a computer-readable storage medium.

BACKGROUND

With the development of science and technology, more and more ultra-short-throw projectors are used. However, when projection pictures of the ultra-short-throw projectors are adjusted, manual adjustment is required for overlapping the projection pictures with screens, and the adjustment mode is low in accuracy and poor in operability.

Therefore, those skilled in the art need to solve the problem of how to provide a solution for solving the foregoing technical problem.

SUMMARY

The objective of this application is to provide an ultra-short-throw picture and screen alignment method, an ultra-short-throw picture and screen alignment apparatus, an ultra-short-throw projector, and a computer-readable storage medium, which can realize automatically adjusting a projection picture to be overlapped with a screen and achieve a simple and high-accuracy adjustment mode. The specific solution is as follows.

This application discloses an ultra-short-throw picture and screen alignment method which includes the following steps.

When a current projection picture of the ultra-short-throw projector covers a screen, an image is acquired by a wide-angle camera, and positioning is performed according to the image to obtain a projection position.

According to a position of the screen and the projection position, a size and a position of the current projection picture are adjusted, so that the position of the adjusted projection picture is overlapped with a target position.

Optionally, the step that when a current projection picture of the ultra-short-throw projector covers a screen, an image is acquired by a wide-angle camera, and positioning is performed according to the image to obtain a projection position includes the following step.

When the picture of the ultra-short-throw projector covers the screen, the image of the screen is acquired by the wide-angle camera, and the screen is positioned by means of an image processing technology according to the image of the screen.

Optionally, the image processing technology is an image segmentation method.

Optionally, the step that when a current projection picture of the ultra-short-throw projector covers a screen, an image is acquired by a wide-angle camera, and positioning is performed according to the image to obtain a projection position includes the following steps.

When an all-black video is projected, the wide-angle camera is used for acquiring an all-black image including the all-black video, and the all-black image serves as a background image.

When an all-white video is projected, the wide-angle camera is used for acquiring an all-white image including the all-white video, and the all-white image serves as a foreground image.

The background image and the foreground image are differentiated to obtain the projection position.

Optionally, the step that according to a position of the screen and the projection position, a size and a position of the current projection picture are adjusted, so that the position of the adjusted projection picture is overlapped with a target position includes the following steps.

A pixel deviation between a pixel value of the position of the screen and a corresponding pixel value of the projection position is calculated.

Preset points of the current projection picture are moved according to the pixel deviation and a preset step length, so that the preset points are overlapped with corresponding angular points of the screen.

Optionally, after the step that according to a position of the screen and the projection position, a size and a position of the current projection picture are adjusted, so that the position of the adjusted projection picture is overlapped with a target position, the method further includes the following steps.

A deviation value between the position of the adjusted projection picture and the position of a target screen is calculated.

Whether the deviation value is smaller than a preset deviation threshold value or not is judged.

Completion of adjustment is determined when the deviation value is smaller than the preset deviation threshold value.

This application discloses an ultra-short-throw picture and screen alignment apparatus which includes a position determination module and an adjustment module.

The position determination module which is configured to acquire an image by a wide-angle camera, and perform positioning according to the image to obtain a projection position, when a current projection picture of the ultra-short-throw projector covers a screen.

The adjustment module which is configured to adjust a size and a position of the current projection picture according to a position of the screen and the projection position, so that the position of the adjusted projection picture is overlapped with a target position.

Optionally, the apparatus further includes a screen positioning unit.

The screen positioning unit which is configured to acquire the image of the screen by the wide-angle camera, and position the screen by means of an image processing technology according to the image of the screen, when the picture of the ultra-short-throw projector covers the screen.

This application discloses an ultra-short-throw projector which includes a memory and a processor.

The memory which is configured to store a computer program.

The processor which is configured to execute the computer program to implement the steps of the ultra-short-throw picture and the screen alignment method described above.

This application discloses a computer-readable storage medium. A computer program is stored on the computer-readable storage medium, and when executed by a processor, implements the steps of the ultra-short-throw picture and the screen alignment method.

This application provides an ultra-short-throw picture and screen alignment method which includes the steps: when a current projection picture of the ultra-short-throw projector covers a screen, acquiring an image by a wide-angle camera, and performing positioning according to the image to obtain the projection position; and according to a position of the screen and the projection position, adjusting a size and a position of the current projection picture, so that the position of the adjusted projection picture is overlapped with the target position.

Thus, in this application, the image may be acquired by the wide-angle camera when the projection picture of the ultra-short-throw projector covers the screen, the projection position may be determined according to the accurate image, and the size and the position of the current projection picture may be adjusted according to the position of the screen and the projection position, so as to automatically adjust the position of the projection picture, so that the position of the projection picture is overlapped with the target position. The adjustment mode is simple and high in accuracy. This application further provides an ultra-short-throw picture and screen alignment apparatus, an ultra-short-throw projector, and a computer-readable storage medium all having the foregoing advantages, which will not be elaborated here.

BRIEF DESCRIPTION OF THE DRAWINGS

In order to describe the technical solutions in the embodiments of the disclosure or the related art more clearly, the drawings required to be used in descriptions about the embodiments or the related art will be simply introduced below. It is apparent that the drawings in the following descriptions are only some embodiments of the disclosure. Those of ordinary skill in the art may further obtain other drawings according to these drawings without creative work.

DETAILED DESCRIPTION OF THE EMBODIMENTS

In order to make the objectives, technical solutions, and advantages of the embodiments of this application clearer, the technical solutions in the embodiments of this application will be clearly and completely described below in combination with the drawings in the embodiments of this application. It is apparent that the described embodiments are not all embodiments but part of embodiments of this application. All other embodiments obtained by those of ordinary skill in the art on the basis of the embodiments in this application without creative work shall fall within the scope of protection of this application.

Figure 1:
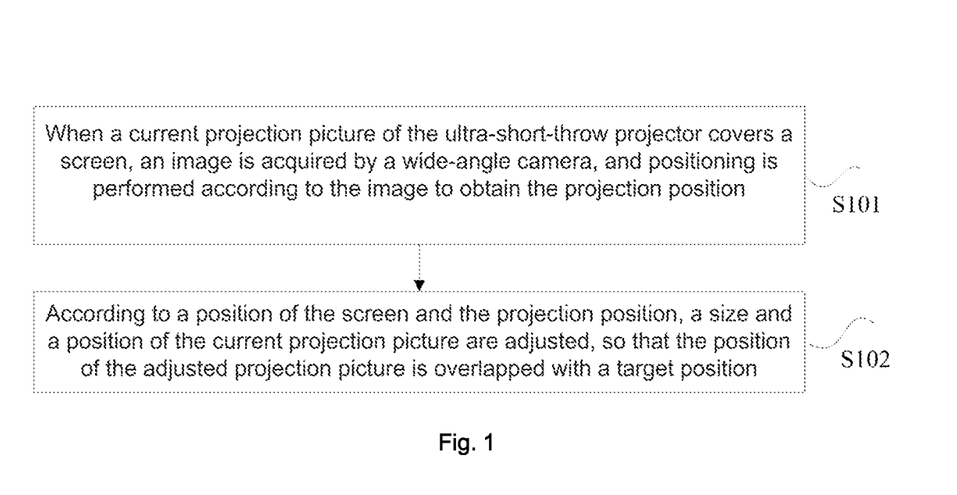
FIG. 1 is a flowchart of an ultra-short-throw picture and screen alignment method according to an embodiment of this application.

With the development of science and technology, more and more ultra-short-throw projectors are used. However, when projection pictures of the ultra-short-throw projectors are adjusted, manual adjustment is required for achieving overlapping between the projection pictures and screens, and adjustment modes are low in accuracy and poor in operability. Based on the above technical problem, the embodiments provide an ultra-short-throw picture and screen alignment method. According to the method, when a projection picture of an ultra-short-throw projector covers a screen, an image is acquired by a wide-angle camera, the position of the screen and a projection position are determined according to the accurate image, a size and a position of the current projection picture are adjusted according to the position of the screen and the projection position, so that the projection picture is automatically adjusted to be overlapped with the screen, and the adjustment mode is simple and high in accuracy. Refer to FIG. 1 for details. FIG. 1 is a flowchart of an ultra-short-throw picture and screen alignment method according to an embodiment of this application, and the method specifically includes the following steps.

At S101, when a current projection picture of the ultra-short-throw projector covers a screen, an image is acquired by a wide-angle camera, and positioning is performed according to the image to obtain the projection position.

The embodiment mainly provides a projection picture adjustment method based on a wide-angle camera for the ultra-short-throw projector. The ultra-short-throw projector is close to the projection picture and large in projection angle. As a regular camera placed on the ultra-short-throw projector cannot take a full picture, the wide-angle camera is used to shoot the image in the embodiment, integrity of the image can be ensued, and further, accurate data support is provided for subsequent position determination.

According to the embodiment, when the projection picture covers the projection screen, the image is acquired by the wide-angle camera. As the projection picture is beyond the screen, a shooting area corresponding to the image includes a first projection picture area on the screen, a second projection picture area beyond the screen and a remaining area, and a first projection picture and a second projection picture form the projection picture. In the embodiment, a mode for determining a position of the screen and the projection position is not limited and may be defined by a user, so as to achieve the objective of the embodiment. The position of the screen may include positions of four angular points of the screen. Correspondingly, the projection position corresponds to the four angular points when the position of the screen includes the four angular points of the screen; and the projection position corresponds to four focal points and points within four sides when the position of the screen includes four angular points and points within the four sides.

In an achievable implementation, the step that when a current projection picture of an ultra-short-throw projector covers a screen, an image is acquired by a wide-angle camera, and positioning is performed according to the image to obtain a projection position includes: when an all-black video is projected, using the wide-angle camera to collect an all-black image including the all-black video, and taking the all-black image as a background image; when an all-white video is projected, using the wide-angle camera to collect an all-white image including the all-white video, and taking the all-white image as a foreground image; and differentiating the background image and the foreground image to obtain the projection position. Particularly, the foreground image and the background image are differentiated, and filtering is performed according to a threshold value to obtain the projection position of a projection area in the image. The method is simple, and projection position acquisition accuracy is high.

Further, before the step that when a current projection picture of the ultra-short-throw projector covers a screen, acquire an image by a wide-angle camera, and perform positioning according to the image to obtain a projection position, the method includes: when the picture of the ultra-short-throw projector covers the screen, acquiring the image of the screen by the wide-angle camera, and positioning the screen by means of an image processing technology according to the image of the screen.

The image of the screen is acquired by the wide-angle camera, the screen can be positioned by means of the image processing technology according to the image of the screen, for example, an image segmentation method or an image processing method by searching image feature points may be used.

In an achievable implementation, the step that when a first projection picture of the ultra-short-throw projector covers a screen, an image of the screen is acquired by the wide-angle camera, and the screen is positioned by means of an image processing technology according to the image of the screen includes: when the screen projection picture of the ultra-short-throw projector covers the screen, acquiring the image of the screen by the wide-angle camera, and positioning the screen by means of an image segmentation method.

The image segmentation method includes but not limited to a threshold-based segmentation method, an area-based segmentation method, an edge-based segmentation method and a specific-theory-based segmentation method, and a user may select methods according to actual demands.

At S102, according to a position of the screen and the projection position, a size and a position of the current projection picture are adjusted, so that the position of the adjusted projection picture is overlapped with a target position.

The target position includes, but is not limited to the position of the screen, a position of the ½ screen, a position of the ⅔ screen, and a position of the ¾ screen.

Figure 2:
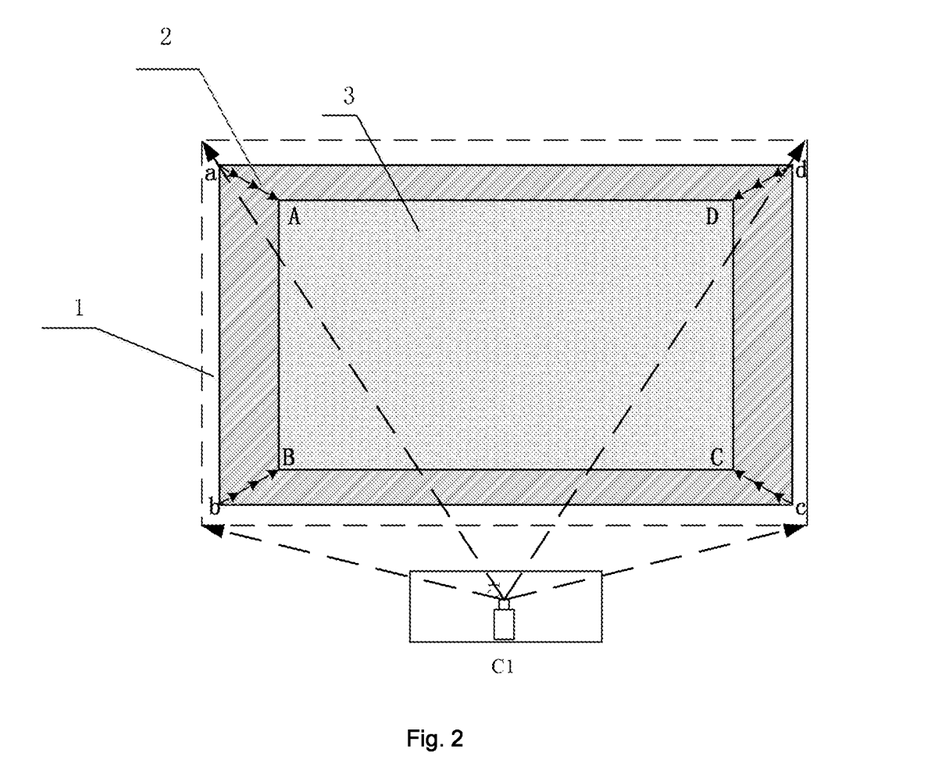
FIG. 2 is a schematic diagram of a picture and screen adjustment provided in this application.

The size and the position of the current projection picture are adjusted according to the position of the screen and the projection position. In one achievable implementation, referring to FIG. 2, which is a schematic diagram of a picture and screen adjustment provided in this application, particularly, a screen area 3 corresponds to a screen, a projection picture area 2 corresponds to a current projection picture, C1 is a wide-angle camera, and a shooting area 1 of the camera C1 corresponds to an image. Understandably, the projection position includes four angular points a, b, c and d; the position of the screen includes A, B, C and D, the target position is the position of the screen, the four angular points are adjusted, so that a is overlapped with A, b is overlapped with B, c is overlapped with C, d is overlapped with D, and the whole current projection picture is overlapped with the screen. The specific method of overlapping according to dragging of the angular points may refer to related technologies, which will not be elaborated in the embodiment.

Figure 3:
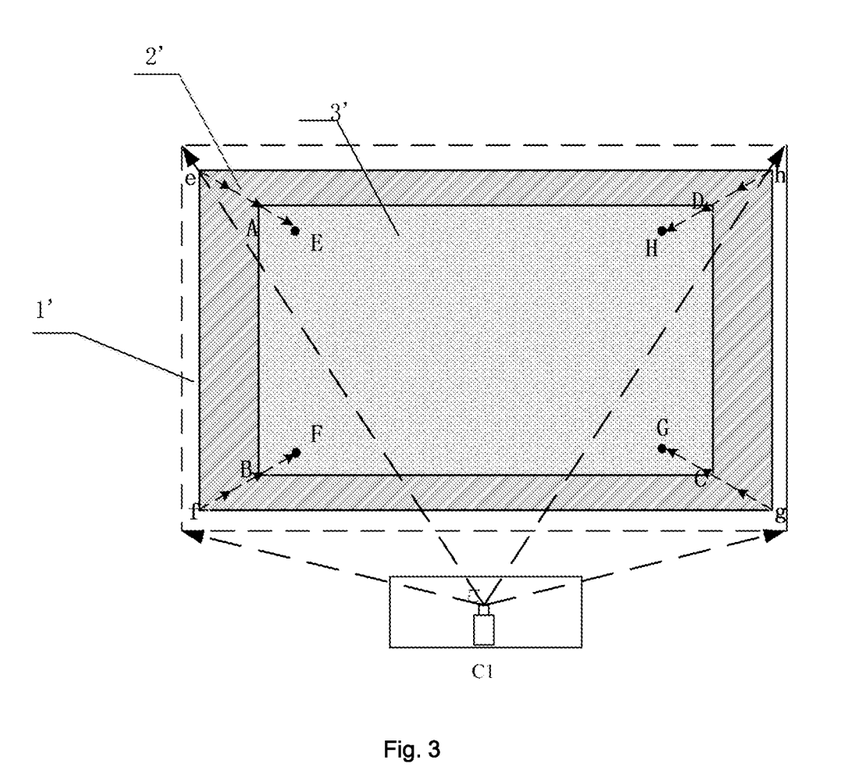
FIG. 3 is a schematic diagram of another picture and screen adjustment provided in this application.

In another achievable implementation, referring to FIG. 3, which is a schematic diagram of another picture and screen adjustment provided in this application, particularly, a screen area 3' corresponds to a screen, a projection picture area 2' corresponds to a current projection picture, C1 is a wide-angle camera, and a shooting area 1' of the camera C1 corresponds to an image. Understandably, the projection position includes four angular points e, f, g and h; the position of the screen includes A, B, C and D, the four angular points are adjusted according to the target positions E, F, H and G obtained according to the position of the screen, so that e is overlapped with E, f is overlapped with F, g is overlapped with G, h is overlapped with H, and the whole current projection picture is overlapped with the target position. The specific method of overlapping according to dragging of the angular points may refer to related technologies, which will not be elaborated in the embodiment.

Further, the step that according to a position of the screen and the projection position, a size and a position of the current projection picture are adjusted, so that the position of the adjusted projection picture is overlapped with a target position includes: calculating pixel deviation between a pixel value of the position of the screen and a corresponding pixel value of the projection position; and moving preset points of the current projection picture to overlap the preset points with corresponding angular points of the screen according to the pixel deviation and a preset step length.

When the projection area covers the projection screen, the position of a projection picture area is identified in real time to judge pixel deviation between the projection position of a current picture and the position of the screen, the preset points of the picture are repeatedly moved according to the preset step length until the position of the picture is overlapped with the position of a screen area, so as to complete an adjustment process. An approximant adjustment method is used for solving the problem that final adjustment positions cannot be positioned once due to distortion of the wide-angle camera.

Further, after the step that according to a position of the screen and the projection position, a size and a position of the current projection picture are adjusted, so that the position of the adjusted projection picture is overlapped with a target position, the method further includes the steps: calculating a deviation value between the position of the adjusted projection picture and the position of a target screen; judging whether the deviation value is smaller than a preset deviation threshold value or not; and determining completion of adjustment when the deviation value is smaller than the preset deviation threshold value.

After the position of the projection picture is overlapped with the target position, in order to further ensure alignment accuracy of the picture and the screen, the deviation value between the projection position and the position of the screen is further calculated. Particularly, when alignment of the picture and the screen is adjusted according to four angular points, an average value of deviation between the four angular points and the corresponding angular points of the screen is calculated to judge the variation between deviation value and the preset deviation threshold value by taking the average value as the deviation value, so as to determine whether adjustment is completed or not.

Based on the above technical solutions, according to the embodiment, when the projection picture of the ultra-short-throw projector covers the screen, the image is acquired by the wide-angle camera, the position of the screen and the projection position are determined according to the accurate image, the size and the position of the current projection picture are adjusted according to the position of the screen and the projection position to automatically adjust the projection picture to be overlapped with the screen, and the adjustment mode is simple and high in accuracy.

Figure 4:
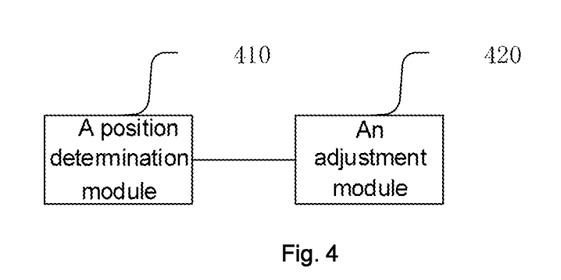
FIG. 4 is a schematic structural diagram of an ultra-short-throw picture and screen alignment apparatus according to an embodiment of this application.
Figure 5:
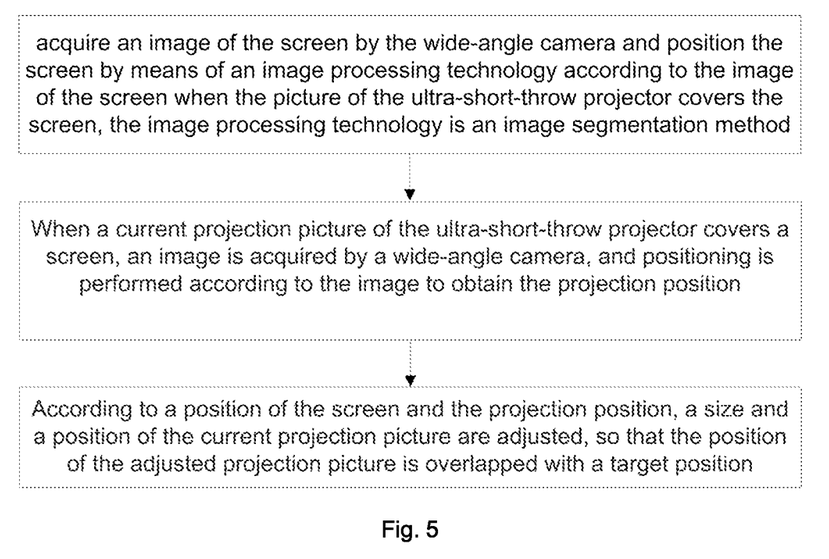
FIG. 5 is a flowchart of an ultra-short-throw picture and screen alignment method according to an embodiment of this application.
Figure 6:
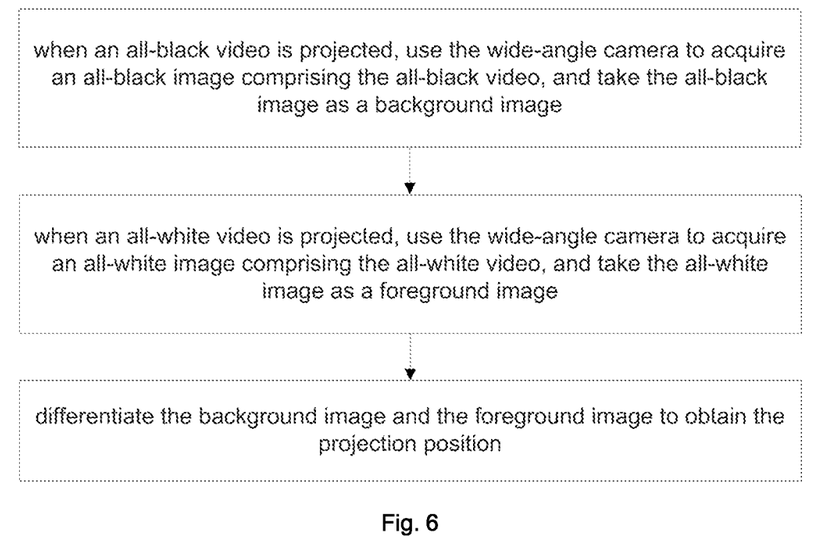
FIG. 6 is a flowchart of an ultra-short-throw picture and screen alignment method according to an embodiment of this application.
Figure 7:
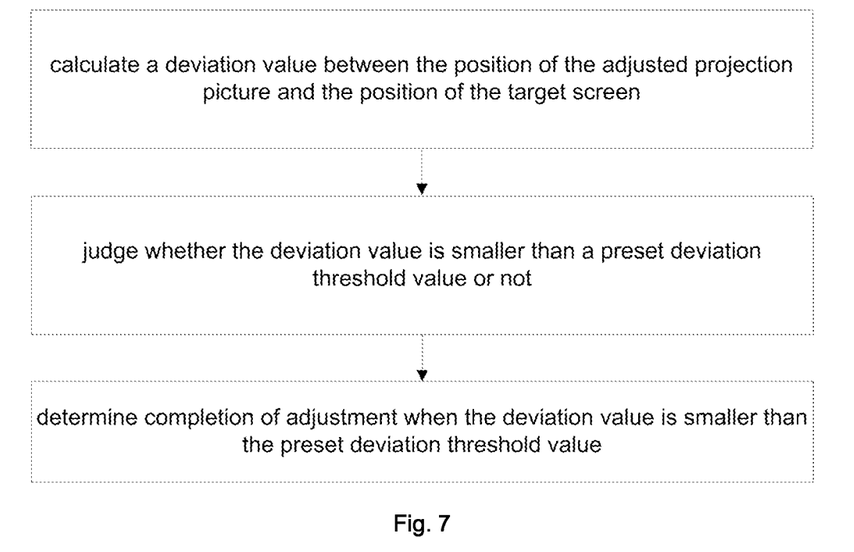
FIG. 7 is a flowchart of an ultra-short-throw picture and screen alignment method according to an embodiment of this application.
Figure 8:
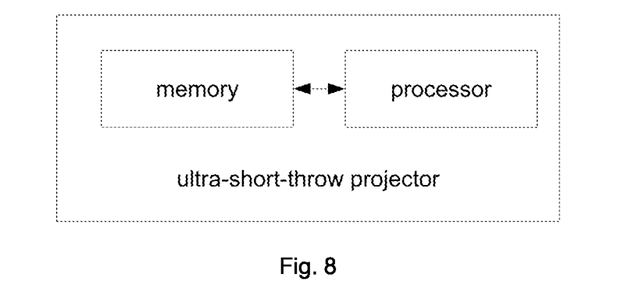
FIG. 8 is a schematic structural diagram of an ultra-short-throw projector according to an embodiment of this application.
Figure 9:
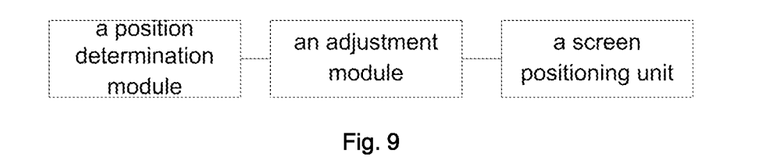
FIG. 9 is a schematic structural diagram of an ultra-short-throw picture and screen alignment apparatus according to an embodiment of this application.

An ultra-short-throw picture and screen alignment apparatus in an embodiment of this application is introduced as follows. The ultra-short-throw picture and screen alignment apparatus described below can mutually correspondingly refer to the ultra-short-throw picture and screen alignment method described above. Referring to FIG. 4, which is a structural schematic diagram of an ultra-short-throw picture and screen alignment apparatus according to an embodiment of this application, the apparatus includes a position determination module 410 and an adjustment module 420.

The position determination module 410 which is configured to acquire an image by a wide-angle camera and perform positioning according to the image to obtain the position of the screen and a projection position, when a projection picture of an ultra-short-throw projector covers the screen.

The adjustment module 420 which is configured to adjust a size and a position of the current projection picture to overlap the position of the adjusted projection picture with a target position according to the position of the screen and the projection position.

Preferably, the apparatus further includes a screen positioning unit.

The screen positioning unit which is configured to acquire an image of the screen by the wide-angle camera and position the screen by means of an image processing technology according to the image of the screen, when a picture of the ultra-short-throw projector covers the screen.

Preferably, the position determination module 410 includes a background image acquisition unit, a foreground image acquisition unit, and a projection position determination unit.

The background image acquisition unit which is configured to acquire an all-black image including an all-black video by the wide-angle camera and take the all-black image as a background image when the all-black video is projected.

The foreground image acquisition unit which is configured to acquire an all-white image including an all-white video by the wide-angle camera and take the all-white image as a foreground image when the all-white video is projected.

The projection position determination unit which is configured to differentiate the background image and the foreground image to obtain the projection position.

Preferably, the adjustment module 420 includes a pixel deviation calculation unit and an adjustment unit.

The pixel deviation calculation unit which is configured to calculate pixel deviation between a pixel value of the position of the screen and a corresponding pixel value of the projection position.

The adjustment unit which is configured to move to overlap the preset points with corresponding angular points of the screen preset points of the current projection picture according to the pixel deviation and a preset step length.

Preferably, the adjustment module further includes a deviation value calculation module, a judgment module, and a determination module.

The deviation value calculation module which is configured to calculate a deviation value between the position of the adjusted projection picture and the position of a target screen.

The judgment module which is configured to judge whether the deviation value is smaller than a preset deviation threshold value or not.

The determination module which is configured to determine completion of adjustment when the deviation value is smaller than the preset deviation threshold value.

As embodiments of the ultra-short-throw picture and screen alignment apparatus mutually correspond to those of the ultra-short-throw picture and screen alignment methods, the embodiments of the ultra-short-throw picture and screen alignment apparatus may refer to descriptions of the embodiments of the ultra-short-throw picture and screen alignment method, which will not be elaborated here.

An ultra-short-throw projector in one embodiment of this application is introduced as follows, and the ultra-short-throw projector described below can mutually correspondingly refer to the ultra-short-throw picture and screen alignment method described above.

The embodiment provides an ultra-short-throw projector which includes a memory and a processor.

The memory which is configured to store a computer program.

The processor which is configured to execute the computer program to implement the steps of the ultra-short-throw picture and screen alignment method described above.

As embodiments of the ultra-short-throw projector mutually correspond to those of the ultra-short-throw picture and screen alignment methods, the embodiments of the ultra-short-throw projector may refer to the descriptions of the embodiments of the ultra-short-throw picture and screen alignment method, which will not be elaborated here.

A computer-readable storage medium in one embodiment of this application is introduced as follows, and the computer-readable storage medium described below can mutually correspondingly refer to the ultra-short-throw picture and screen alignment method described above.

The embodiment provides a computer-readable storage medium. A computer program is stored on the computer-readable storage medium, and when executed by a processor, may implement the steps of the ultra-short-throw picture and the screen alignment method described above.

As the embodiments of the computer-readable storage medium mutually correspond to those of the ultra-short-throw picture and screen alignment methods, the embodiments of the computer-readable storage medium may refer to descriptions of the embodiments of the ultra-short-throw picture and screen alignment method, which will not be elaborated here.

The various embodiments in this specification are described in a progressive manner, each embodiment is described with emphasis upon the differences from other embodiments, and the same or similar parts between the various embodiments can be referred to each other. For the apparatus disclosed in the embodiments, since the apparatus corresponds to the method disclosed in the embodiments, the description is relatively brief, and the relevant part can be explained with reference to the description of the method part.

Those skilled in the art may further realize that the units and steps of each method of each example described in combination with the embodiments disclosed in the disclosure may be implemented by electronic hardware, computer software or a combination of the two. For clearly describing interchangeability of hardware and software, the composition points and steps of each example have been generally described according to functions in the above descriptions. Whether these functions are executed in a hardware or software manner depends on specific applications and design constraints of the technical solutions. Those skilled in the art may realize the described functions for each specific application by virtue of different methods, but such realization shall fall within the scope of this application.

The steps of a method or algorithm described in the embodiments disclosed in this application may be directly implemented by hardware, a software module for execution of the processor, or a combination of the two. The software module can be arranged in a Random Access Memory (RAM), a memory, a Read-Only Memory (ROM), an electrically programmable ROM, an electrically erasable programmable ROM, a register, a hard disk, a removable disk, a CD-ROM, or a storage medium in any other forms known in the art.

The ultra-short-throw picture and screen alignment method, the ultra-short-throw picture and screen alignment apparatus, the ultra-short-throw projector, and the computer-readable storage medium provided in this application are described in detail above. The principle and implementations of this application are elaborated with specific examples in the disclosure, and the descriptions made to the embodiments are only adopted to help the method of this application and the core concept thereof to be understood. It should be pointed out that those of ordinary skill in the art may also make several improvements and modifications without departing from the principle of this application. These improvements and modifications shall fall within the scope of protection of the claims of this application.

What is claimed is:

1. An ultra-short-throw picture and screen alignment method, comprising:
    acquiring an image by a wide-angle camera and performing positioning according to the image to obtain a projection position when a current projection picture of an ultra-short-throw projector covers a screen; and
    adjusting a size and a position of the current projection picture according to the position of the screen and the projection position, so that the position of the adjusted projection picture is overlapped with a target position;
    wherein, acquiring an image by a wide-angle camera and performing positioning according to the image to obtain a projection position when a current projection picture of an ultra-short-throw projector covers a screen comprises:
    when an all-black video is projected, using the wide-angle camera to acquire an all-black image comprising the all-black video, and taking the all-black image as a background image;
    when an all-white video is projected, using the wide-angle camera to acquire an all-white image comprising the all-white video, and taking the all-white image as a foreground image; and
    differentiating the background image and the foreground image to obtain the projection position.

2. The ultra-short-throw picture and screen alignment method as claimed in claim 1, wherein before acquiring an image by the wide-angle camera and performing positioning according to the image to obtain a projection position when a current projection picture of an ultra-short-throw projector covers a screen, the method comprises:
    acquiring an image of the screen by the wide-angle camera and positioning the screen by means of an image processing technology according to the image of the screen when the picture of the ultra-short-throw projector covers the screen.

3. The ultra-short-throw picture and screen alignment method as claimed in claim 2, wherein the image processing technology is an image segmentation method.

4. The ultra-short-throw picture and screen alignment method as claimed in claim 1, wherein adjusting a size and a position of the current projection picture according to the position of the screen and the projection position, so that the position of the adjusted projection picture is overlapped with a target position comprises:
    calculating a pixel deviation between a pixel value of the position of the screen and a corresponding pixel value of the projection position; and
    moving preset points of the current projection picture to overlap the preset points with corresponding angular points of the screen according to the pixel deviation and a preset step length.

5. The ultra-short-throw picture and screen alignment method as claimed in claim 1, wherein after adjusting a size and a position of the current projection picture according to a position of the screen and the projection position, so that the position of the adjusted projection picture is overlapped with a target position, the method further comprises:
    calculating a deviation value between the position of the adjusted projection picture and the position of the target screen;
    judging whether the deviation value is smaller than a preset deviation threshold value or not; and
    determining completion of adjustment when the deviation value is smaller than the preset deviation threshold value.

6. An ultra-short-throw picture and screen alignment apparatus, a hardware processor coupled with a memory and configured to execute program units stored on the memory, wherein the program units comprising:
    a position determination module which is configured to acquire an image by a wide-angle camera and perform positioning according to the image to obtain a projection position, when a current projection picture of an ultra-short-throw projector covers the screen; and
    an adjustment module which is configured to adjust a size and a position of the current projection picture, according to a position of the screen and the projection position, so that the position of the adjusted projection picture is overlapped with a target position.

7. The ultra-short-throw picture and screen alignment apparatus as claimed in claim 6, a hardware processor coupled with a memory and configured to execute program units stored on the memory, wherein the program units comprising:
    a screen positioning unit which is configured to acquire an image of the screen by the wide-angle camera and position the screen by means of an image processing technology according to the image of the screen, when the picture of the ultra-short-throw projector covers the screen.

8. An ultra-short-throw projector, comprising:
    a memory which is configured to store a computer program; and
    a processor which is configured to execute the computer program to implement the steps of the ultra-short-throw picture and the screen alignment method as claimed in claim 1.

9. A computer-readable non-transitory storage medium, wherein a computer program is stored on the computer-readable storage medium, and when executed by a processor, implements the steps of the ultra-short-throw picture and the screen alignment method as claimed in claim 1.

10. The ultra-short-throw picture and screen alignment method as claimed in claim 2, wherein after adjusting a size and a position of the current projection picture according to a position of the screen and the projection position, so that the position of the adjusted projection picture is overlapped with a target position, the method further comprises:
- calculating a deviation value between the position of the adjusted projection picture and the position of the target screen;
- judging whether the deviation value is smaller than a preset deviation threshold value or not; and
- determining completion of adjustment when the deviation value is smaller than the preset deviation threshold value.

11. The ultra-short-throw picture and screen alignment method as claimed in claim 3, wherein after adjusting a size and a position of the current projection picture according to a position of the screen and the projection position, so that the position of the adjusted projection picture is overlapped with a target position, the method further comprises:
- calculating a deviation value between the position of the adjusted projection picture and the position of the target screen;
- judging whether the deviation value is smaller than a preset deviation threshold value or not; and
- determining completion of adjustment when the deviation value is smaller than the preset deviation threshold value.

12. The ultra-short-throw picture and screen alignment method as claimed in claim 1, wherein after adjusting a size and a position of the current projection picture according to a position of the screen and the projection position, so that the position of the adjusted projection picture is overlapped with a target position, the method further comprises: calculating a deviation value between the position of the adjusted projection picture and the position of the target screen; judging whether the deviation value is smaller than a preset deviation threshold value or not; and determining completion of adjustment when the deviation value is smaller than the preset deviation threshold value.

13. The ultra-short-throw picture and screen alignment method as claimed in claim 4, wherein after adjusting a size and a position of the current projection picture according to a position of the screen and the projection position, so that the position of the adjusted projection picture is overlapped with a target position, the method further comprises:
- calculating a deviation value between the position of the adjusted projection picture and the position of the target screen;
- judging whether the deviation value is smaller than a preset deviation threshold value or not; and
- determining completion of adjustment when the deviation value is smaller than the preset deviation threshold value.

14. The ultra-short-throw picture and screen alignment method as claimed in claim 5, wherein after adjusting a size and a position of the current projection picture according to a position of the screen and the projection position, so that the position of the adjusted projection picture is overlapped with a target position, the method further comprises:
- calculating a deviation value between the position of the adjusted projection picture and the position of the target screen;
- judging whether the deviation value is smaller than a preset deviation threshold value or not; and
- determining completion of adjustment when the deviation value is smaller than the preset deviation threshold value.

15. An ultra-short-throw projector, comprising:
- a memory which is configured to store a computer program; and
- a processor which is configured to execute the computer program to implement the steps of the ultra-short-throw picture and the screen alignment method as claimed in claim 2.

16. An ultra-short-throw projector, comprising:
- a memory which is configured to store a computer program; and
- a processor which is configured to execute the computer program to implement the steps of the ultra-short-throw picture and the screen alignment method as claimed in claim 3.

17. An ultra-short-throw projector, comprising: a memory which is configured to store a computer program; and a processor which is configured to execute the computer program to implement the steps of the ultra-short-throw picture and the screen alignment method as claimed in claim 1.

18. An ultra-short-throw projector, comprising:
- a memory which is configured to store a computer program; and
- a processor which is configured to execute the computer program to implement the steps of the ultra-short-throw picture and the screen alignment method as claimed in claim 4.

19. An ultra-short-throw projector, comprising:
- a memory which is configured to store a computer program; and
- a processor which is configured to execute the computer program to implement the steps of the ultra-short-throw picture and the screen alignment method as claimed in claim 5.

* * * * *